(12) United States Patent
Subrahmanyan et al.

(10) Patent No.: US 12,475,127 B1
(45) Date of Patent: Nov. 18, 2025

(54) EFFICIENT SUPERBLOCK DATA STRUCTURES FOR DATABASE SYSTEMS

(71) Applicant: Amazon Technologies, Inc., Seattle, WA (US)

(72) Inventors: Aditya Subrahmanyan, San Francisco, CA (US); Gokul Soundararajan, San Jose, CA (US); Sriram Subramanian, Mountain View, CA (US); Venu Gopal Nayar, San Jose, CA (US); Frederick Ryan Johnson, Orem, UT (US); Naga Raju Bhanoori, Union City, CA (US); Hebatalla Mohamed Mohamed Aly Eldakiky, Fullerton, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/898,488

(22) Filed: Sep. 26, 2024

(51) Int. Cl.
*G06F 16/00* (2019.01)
*G06F 16/23* (2019.01)
*G06F 16/2455* (2019.01)
*G06F 16/28* (2019.01)

(52) U.S. Cl.
CPC .... *G06F 16/24561* (2019.01); *G06F 16/2358* (2019.01); *G06F 16/2379* (2019.01); *G06F 16/285* (2019.01)

(58) Field of Classification Search
None
See application file for complete search history.

(56) References Cited

U.S. PATENT DOCUMENTS

| | | | |
|---|---|---|---|
| 8,176,013 B2 * | 5/2012 | Passey | G06F 16/13 707/656 |
| 9,542,396 B1 * | 1/2017 | Pawar | G06F 11/1471 |
| 9,880,773 B2 | 1/2018 | Rajani et al. | |
| 10,860,547 B2 | 12/2020 | Passey et al. | |
| 2017/0193012 A1 * | 7/2017 | Gupta | G06F 16/2329 |

* cited by examiner

*Primary Examiner* — Anhtai V Tran
(74) *Attorney, Agent, or Firm* — S. Scott Foster; Kowert, Hood, Munyon, Rankin & Goetzel, P.C.

(57) ABSTRACT

Efficient superblock data structures are implemented for a data set. A superblock data structure, a log to commit changes to a superblock data structure, and an auxiliary data structure may be updated when an update to a data set is performed. The update may update respective location headers in the auxiliary data structure and the superblock data structure.

20 Claims, 8 Drawing Sheets

EFFICIENT SUPERBLOCK DATA STRUCTURES FOR DATABASE SYSTEMS

BACKGROUND

As the technological capacity for organizations to create, track, and retain information continues to grow, a variety of different technologies for managing and storing the rising tide of information have been developed. Database systems, for example, provide clients with many different specialized or customized configurations of hardware and software to manage stored information. However, the increasing amounts of data that organizations must store and manage often correspondingly increases both the size and complexity of data storage and management technologies, like database systems, which in turn escalate the cost of maintaining the information.

New technologies more and more seek to reduce both the complexity and storage requirements of maintaining data while simultaneously improving the efficiency of data processing. For example, data processing resources may be efficiently configured to perform different workloads. However, given that many workloads are unknown when data processing resources are configured, or change over time. Challenges in obtaining the right configuration of data processing resources occur frequently.

Figure 1:
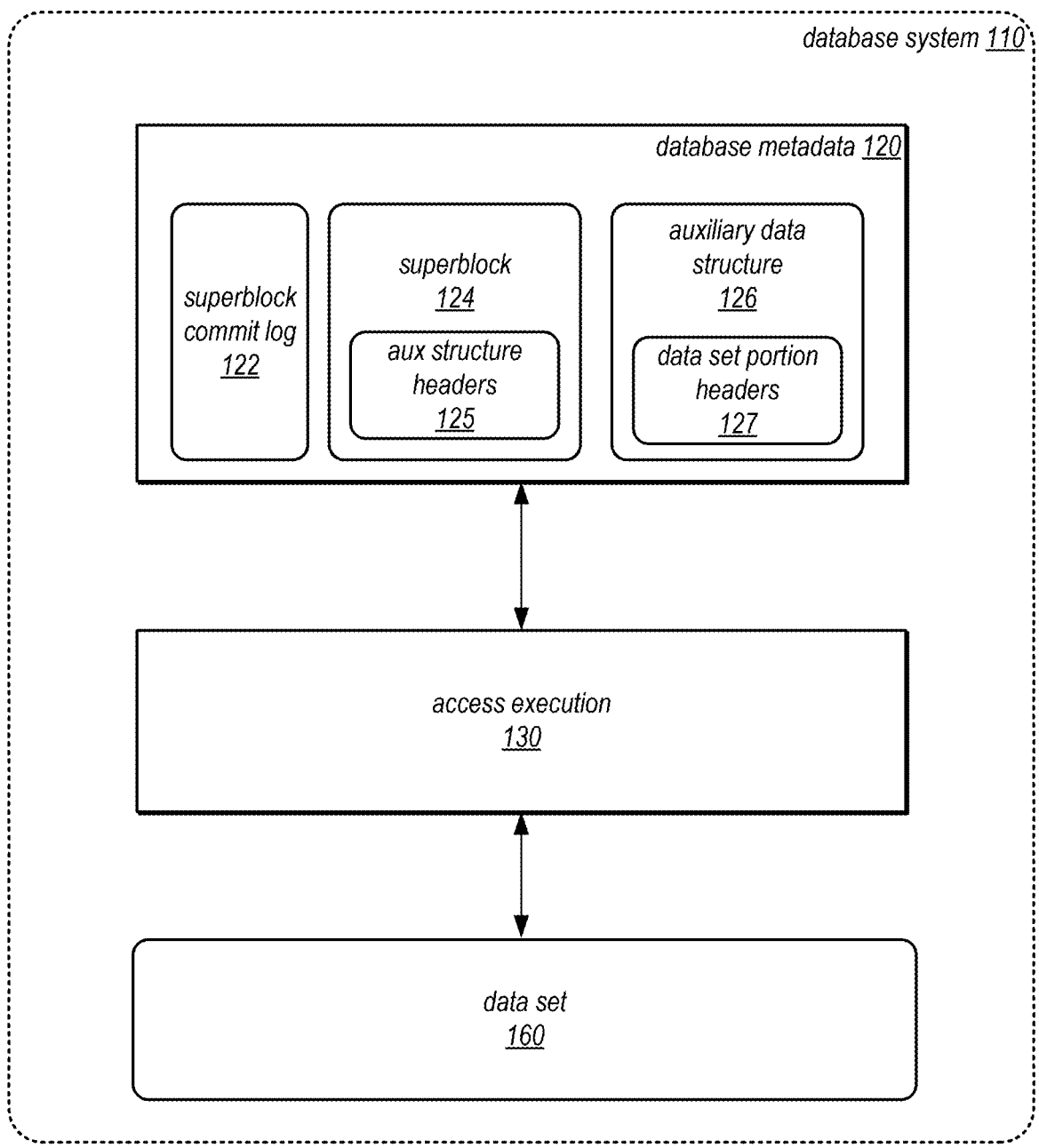
FIG. 1 illustrates a logical block diagram of efficient superblock data structures for database systems, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Database systems may use a superblock that includes various kinds of metadata that is used to perform many different database operations in the database system. As the size of data in a database grows, the size of the superblock may grow. Such size increases may undermine or reduce the performance of a database system to perform database operations as the amount of data to maintain, update, or search within the superblock may also increase. For example, user or application data, such as the data stored in a table, collection, or other data set which is stored and managed by a database system, may be accessed using the superblock which stores information used to access different portions of the user or application data (e.g., information to access each block of data in storage).

A superblock may map, link, index, or otherwise point to different portions of data such that database operations like restarts, commits, backups, and query or other access request execution may depend upon reading, traversing or otherwise searching the superblock. For example, a superblock may include a monolithic array including of a superblock header (e.g., indicating a number and size of blocks of application data), superblock mid (e.g., a free list of blocks, encryption and/or error checking information, and commit information), and an array of block headers (e.g., which point to corresponding blocks of application data). A large superblock can result long restart times as a large amount of memory may be used to read and/or evaluate the superblock in order to access data for the different database operations.

In various embodiments, efficient superblock data structures for database systems may be implemented to increase performance of database systems (and other computer-related technologies that depend upon database system performance), reducing the size of a superblock (e.g., in memory and/or in persistent storage) and decreasing the time and/or complexity to search and update the superblock. For example, in at least one embodiment efficient superblock data structures may place block headers for user/application data into an auxiliary data structure that is updated separately from the superblock, which may instead store headers or other pointer information to the auxiliary data structure. In at least one embodiment, a commit log for the superblock may be used to persist changes to the superblock when updates are made to user/application data.

FIG. 1 illustrates a logical block diagram of efficient superblock data structures for database systems, according to some embodiments. Database system 110 may implement arrangements of one or more multiple nodes (e.g., computing systems, application, or devices, such as computing system 1000 in FIG. 8). Database system 110 may be implemented as a standalone system or as a distributed database system (e.g., as a database hosed by a database service as discussed below with regard to FIGS. 2-5). Database system 110 may implement one or more components 130 that coordinate perform access requests and/or other database operations as illustrated in FIG. 1 to access a data set 160 using database metadata 120. In some embodiments, access coordination 130 may be distributed amongst multiple nodes which, as exemplified in FIG. 3 below, may operate as a cluster that provides parallel processing with respect to different portions of a data set. In other embodiments, a single access execution component 130 (or single coordination component that directs further access components that execute in parallel) may utilize database metadata 120 to provide access to data set 160.

Database system 110 may implement various types of databases, that store data in different formats and/or support different types of data processing features or access requests. For example, database system 110 may be a relational database system, storing data in a table format (e.g., with an enforced schema of same number of columns per row) accessible using Structured Query Language (SQL) queries, or database system 110 may be a non-relational database system storing data in a non-table format (or a table-format that does not enforce a schema requiring a same number of columns per item/row) accessible using a REST-style API of put, get, or other instructions along with keys to access individual items. In other embodiments, other types or formats of database system 110 may be implemented.

In at least one embodiment, database system 110 may receive and responds to requests, instructions or various other tasks that may access, utilize, rely upon, or provide data from data set 160. For example, access execution 130 may implement various request processing engines, components, or other features to interpret, perform, execute, or otherwise coordinate the requests, instructions or various other tasks that are received. In at least one embodiment, access execution 130 may implement an efficient superblock format in database metadata 120 that utilizes superblock 124, auxiliary data structure 126, and superblock commit log 122. As part of superblock 124, auxiliary data structure headers 125 which describes various portions of auxiliary data structure 126 (e.g., a B-epsilon tree) may be stored and efficiently updated by storing data that is descriptive of data set 160 separately in auxiliary data structure 126 as data set portion headers 127 (e.g., data block headers). As discussed in detail below, this format may allow for performance improvements across a number of distributed database system tasks, including query processing, restart, data sharing, and compute scaling, among others.

For example, instead of superblock 124 storing data set portion headers 127, which may correspond to each portion (e.g., each block of data set 160), superblock 124 may store headers (e.g., pointers and/or other descriptive information) of portions of auxiliary data structure 126 as auxiliary structure headers 125. The amount of storage space for these auxiliar structure headers 125 may be significantly less than data set portion headers 127, making the storage space of superblock 124 significantly less. Additionally, because the amount of data retained in the superblock 124 has been reduced the coordination implemented for making updates to superblock 124 can also be reduced to improve the speed and reduce complexity of updating the superblock 124. For example, superblock commit log 122 may be used to commit changes to superblock 124 (e.g., changes to aux structure headers 125) using a log-based commit technique. Because the changes that have to committed are reduced to auxiliary structure headers 125, the time to commit these changes is also reduced. A log-based commit technique may include recording a change to the commit log 122 and then making the change in the superblock 124. In this way, the commit log 122 can be read in the event of a database system 110 failure to determine what the state of superblock 124 should be (e.g., a failure occurs between recording the change in commit log 122 and making the change to aux structure headers 125).

Various types of auxiliary data structures 126 may be implemented, in some embodiments, to store the data set portion headers 127. For example, tree-structures may store data set portion headers 127 in leaf nodes or at other nodes of a tree structure. Tree-structures may including various self-balancing trees (b-trees) or log-structured merge trees that may be implemented. In at least one embodiment, a b-epsilon tree may be implemented. A b-epsilon tree ($B^\varepsilon$-tree) may be a tree data structure that provides a key-value interface to support inserts, deletes, range queries, and key-value updates. A $B^\varepsilon$-tree may have internal nodes that store pivot keys and child pointers, and leaf nodes that store key-value pairs, sorted by key. A $B^\varepsilon$-tree may also implement a buffer for internal nodes that may store or otherwise encode updates that will eventually be applied to leaf nodes under (connected to) the internal node. A buffer in a $B^\varepsilon$-tree may be sized according to the & value (e.g., between 0 and 1). Insertion or update of values into a $B^\varepsilon$-tree are stored as insert/update messages in the appropriate buffer. Deletion of values may be stored as tombstone messages to mark an item for deletion. Messages in a buffer may may be flushed from a higher internal node to a lower internal node at optimal times and/or optimal performance I/O performance (e.g., when the number of messages to flush amortizes the cost of IO operations to produce a minimal amount of I/O per message) until ultimately being applied to a leaf node. A leaf node may split when it becomes too full. Likewise an internal node, along with its buffer may be split. The use of auxiliary data structures, like $B^\varepsilon$-tree, may allow for further performance optimizations to be introduced to superblock 124.

Please note that the previous description of a database system, nodes, including access execution and a data set, are a logical description and thus is not to be construed as limiting as to the implementation of a these features, or portions thereof.

This specification continues with a general description of a provider network that implements multiple different services, including a database service and storage service, which may implement efficient superblock data structures for database systems. Then various examples of the database service and storage service, including different components/modules, or arrangements of components/module that may be employed as part of implementing the services are discussed. A number of different methods and techniques to implement efficient superblock data structures for database systems are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
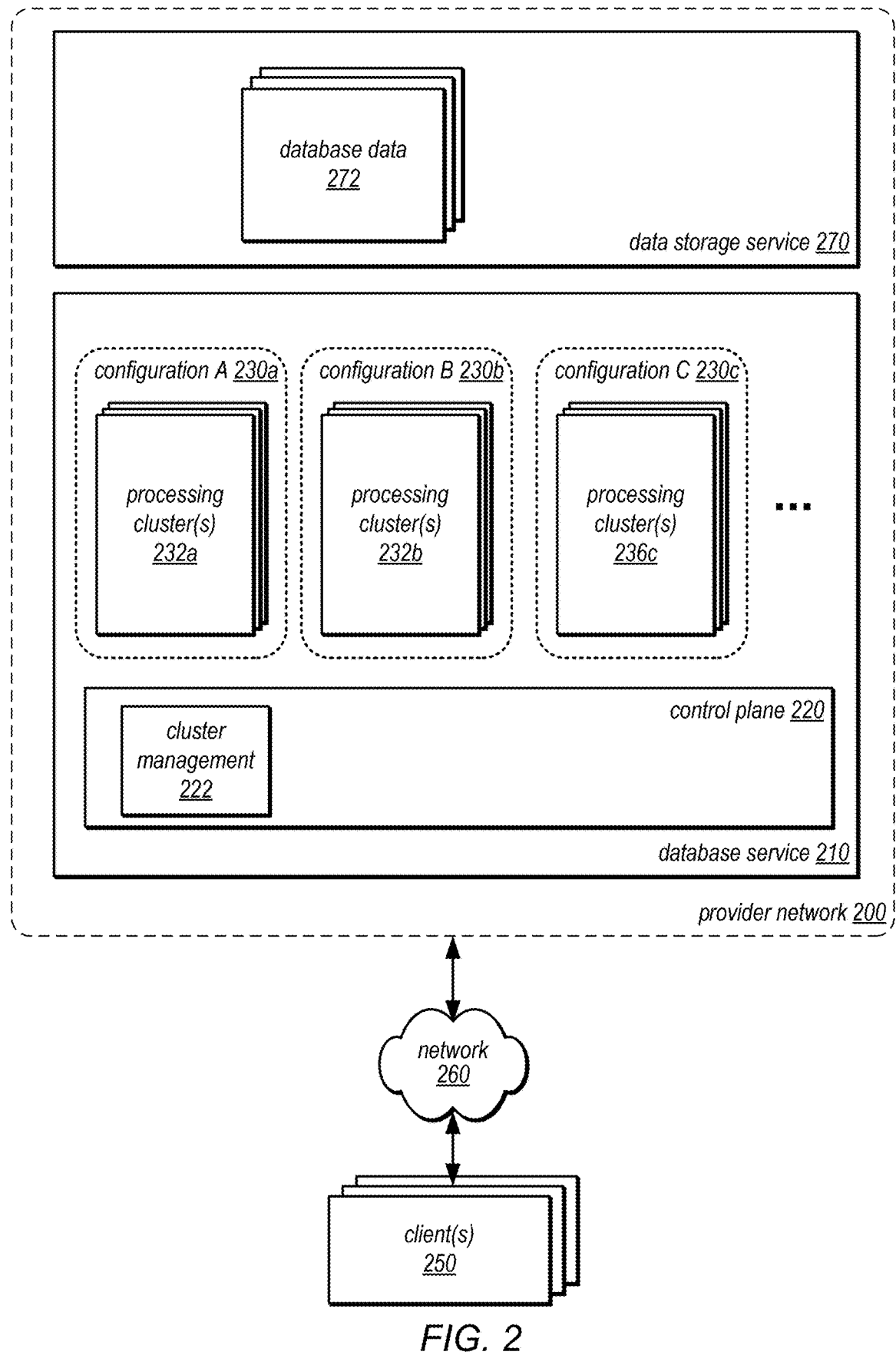
FIG. 2 is a logical block diagram illustrating a provider network offering a database service that implements efficient superblock data structures for databases managed by the database service, according to some embodiments.

FIG. 2 is a logical block diagram illustrating a provider network offering a database service that implements efficient superblock data structures for database systems for databases managed by the database service, according to some embodiments. Provider network 200 may be a private or closed system or may be set up by an entity such as a company or a public sector organization to provide one or more services (such as various types of cloud-based storage) accessible via the Internet and/or other networks to clients 250.

Provider network 200 may be implemented in a single location or may include numerous data centers hosting various resource pools, such as collections of physical and/or virtualized computer servers, storage devices, networking equipment and the like (e.g., computing system 1000 described below with regard to FIG. 8), needed to implement and distribute the infrastructure and storage services offered by the provider network 200. The provider network 200 can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Database users can connect to availability zones of the provider network 200 via a publicly accessible network (e.g., the Internet, a cellular communication network).

Regions are connected to a global network which includes private networking infrastructure (e.g., fiber connections controlled by the cloud provider) connecting each region to at least one other region. The provider network 200 may deliver content from points of presence outside of, but networked with, these regions by way of edge locations and regional edge cache servers. An edge location can be an extension of the cloud provider network outside of the traditional region/AZ context. For example an edge location can be a data center positioned to provide capacity to a set of database users within a certain latency requirement, a set of servers provided to a database user's premises, or a set of servers provided within (or forming part of) a cellular communications network, each of which can be controlled at least in part by the control plane of a nearby AZ or region. This compartmentalization and geographic distribution of computing hardware enables the provider network 200 to provide low-latency resource access to database users on a global scale with a high degree of fault tolerance and stability.

The traffic and operations of the provider network may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes database user resources that are implemented on the cloud provider network (e.g., computing instances, containers, block storage volumes, databases, file storage). Data plane traffic generally includes non-administrative operations such as transferring database user data to and from the database user resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

In some embodiments, provider network 200 may implement various computing resources or services, such as database service(s) 210, (e.g., relational database services, non-relational database services, graph database, time series database, a map reduce service, a data warehouse service, and/or other large scale data processing services or various other types database services), data storage service 270 (e.g., object storage services or block-based storage services that may implement a centralized data store for various types of data), and/or any other type of network based services (which may include a virtual compute service and various other types of storage, processing, analysis, communication, event handling, visualization, and security services not illustrated).

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 8 and described below. In various embodiments, the functionality of a given system or service component (e.g., a component of database service 210 or data storage service 270) may be implemented by a particular node or may be distributed across several nodes. In some embodiments, a given node may implement the functionality of more than one service system component (e.g., more than one data store component).

Database services 210 may be (or included in) various types of data processing services that perform general or specialized data processing functions (e.g., anomaly detection, machine learning, data mining, big data querying, or any other type of data processing operation). For example, in at least some embodiments, database services 210 may include a map reduce service that creates clusters of processing nodes that implement map reduce functionality over data stored in the map reduce cluster as well as data stored in data storage service 270. In another example, database service 210 may include various types of database services (both relational and non-relational) for storing, querying, and updating data. Such services may be enterprise-class database systems that are highly scalable and extensible. Queries may be directed to a database in database service 210 that is distributed across multiple physical resources, and the resource configurations, such as processing clusters 232, used to process the queries may be scaled up or down on an as needed basis, as discussed in detail below with regard to FIGS. 3-8.

Database service 210 may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system. For instance, database service 210 may implement, in some embodiments, a data warehouse service, that utilizes another data processing service, to execute portions of queries or other access requests with respect to data that is stored in a remote data store, such as data storage service(s) 270 (or a data store external to provider network 200) to implement distributed data processing for distributed data sets.

In at least some embodiments, database service 210 may be a data warehouse service. Thus in the description that follows database service 210 may be discussed according to the various features or components that may be implemented as part of a data warehouse service, including control plane 220, and processing clusters 232. Note that such features or components may also be implemented in a similar fashion for other types of database services and thus the following examples may be applicable to other types of database service 210. Database service 210 may implement one (or more) processing clusters that are attached to a database (e.g., a data warehouse). In some embodiments, these processing clusters may be designated as a primary and secondary (or concurrent, additional, or burst processing clusters) that perform queries to an attached database warehouse.

In embodiments where database service 210 is a data warehouse service, the data warehouse service may offer clients a variety of different data management services, according to their various needs. In some cases, clients may wish to store and maintain large of amounts data, such as sales records marketing, management reporting, business process management, budget forecasting, financial reporting, website analytics, or many other types or kinds of data. A client's use for the data may also affect the configuration of the data management system used to store the data. For instance, for certain types of data analysis and other operations, such as those that aggregate large sets of data from small numbers of columns within each row, a columnar database table may provide more efficient performance. In other words, column information from database tables may be stored into data blocks on disk, rather than storing entire rows of columns in each data block (as in traditional database schemes). The following discussion describes various embodiments of a relational columnar database system. However, various versions of the components discussed below as may be equally adapted to implement embodiments for various other types of relational database systems, such as row-oriented database systems. Therefore, the following examples are not intended to be limiting as to various other types or formats of database systems.

In some embodiments, storing table data in such a columnar fashion may reduce the overall disk I/O requirements for various queries and may improve analytic query performance. For example, storing database table information in a columnar fashion may reduce the number of disk I/O requests performed when retrieving data into memory to perform database operations as part of processing a query (e.g., when retrieving all of the column field values for all of the rows in a table) and may reduce the amount of data that needs to be loaded from disk when processing a query. Conversely, for a given number of disk requests, more column field values for rows may be retrieved than is necessary when processing a query if each data block stored entire table rows. In some embodiments, the disk requirements may be further reduced using compression methods that are matched to the columnar storage data type. For example, since each block contains uniform data (i.e., column field values that are all of the same data type), disk storage and retrieval requirements may be further reduced by applying a compression method that is best suited to the particular column data type. In some embodiments, the savings in space for storing data blocks containing only field values of a single column on disk may translate into savings in space when retrieving and then storing that data in system memory (e.g., when analyzing or otherwise processing the retrieved data).

Database service 210 may be implemented by a large collection of computing devices, such as customized or off-the-shelf computing systems, servers, or any other combination of computing systems or devices, such as the various types of systems 1000 described below with regard to FIG. 8. Different subsets of these computing devices may be controlled by control plane 220. Control plane 220, for example, may provide a cluster control interface to clients or users who wish to interact with the processing clusters, such as processing cluster(s) 232*a*, 232*b*, and 232*c* managed by control plane 220. For example, control plane 220 may generate one or more graphical user interfaces (GUIs) for clients, which may then be utilized to select various control functions offered by the control interface for the processing clusters 232 hosted in the database service 210. Control plane 220 may provide or implement access to various metrics collected for the performance of different features of database service 210, including processing cluster performance, in some embodiments.

As discussed above, various clients (or database users, organizations, entities, or users) may wish to store and manage data using a database service 210. Processing clusters 232 may respond to various requests, including write/update/store requests (e.g., to write data into storage) or queries for data (e.g., such as a Server Query Language request (SQL) for particular data), as discussed below with regard to FIGS. 3 and 5. For example, multiple users or clients may access a processing cluster to obtain data warehouse services.

For databases manually managed by users, database service 210 may provide database endpoints directly to the clusters which allow the users manage in order to implement client applications that send requests and other messages directly to a particular cluster. Database endpoints, for example may be a network endpoint associated with a particular network address, such as a URL, which points to a resources, such as processing clusters 232 that are attached to the database for query processing. For instance, a client may be given the network endpoint "http://mycluster.com" to send various request messages to. Multiple clients (or users of a particular client) may be given a database endpoint for the same database. Various security features may be implemented to prevent unauthorized users from accessing the databases.

Processing clusters, such as processing clusters 232*a*, 232*b*, and 232*c*, hosted by database service 210 may provide an enterprise-class database query and management system that allows users to send data processing requests to be executed by the clusters 232, such as by sending a query. Processing clusters 232 may perform data processing operations with respect to data stored locally in a processing cluster, as well as remotely stored data. For example, data storage service 270 implemented by provider network 200 that stores remote data, such as backups or other data of a database stored in a cluster. In some embodiments, database data 272 may not be stored locally in a processing cluster 232 but instead may be stored in data storage service 270 (e.g., with data being partially or temporarily stored in processing cluster 232 to perform queries). Queries sent to a processing cluster 232 (or routed/redirect/assigned/allocated to processing cluster(s)) may be directed to local data stored in the processing cluster and/or remote data. Therefore, processing clusters may implement local data processing, such as local data processing, (discussed below with regard to FIG. 5) to plan and execute the performance of queries with respect to local data in the processing cluster, as well as a remote data processing client.

Database service 210 may implement different types or configurations of processing clusters. For example, different configurations A 230*a*, B 230*b*, and C 230*c*, may utilize various different configurations of computing resources, including, but not limited to, different numbers of computational nodes, different processing capabilities (e.g., processor size, power, custom or task-specific hardware, such as hardware optimized to perform different operations, such as regular expression searching, or other data processing operations), different amounts of memory, different networking capabilities, and so on. Thus, for some queries, different configurations 230 of processing cluster 232 may offer different execution times. Different configurations 230 of processing clusters 232 may be maintained in different pools of available processing clusters to be attached to a database. Attached processing clusters may then be made exclusively assigned or allocated for the use of performing queries to the attached database, in some embodiments. The number of processing clusters 232 attached to a database may change over time according to the selection techniques discussed below.

In at least one embodiment, one or more processing cluster(s) 232 may have management of a database, sometimes referred to as a producer cluster, but may allow another processing cluster 232 to also access the database as a "datashare." A datashare may allow support the exchange of various metadata between processing clusters in order to facilitate interactions of an additional processing cluster, sometimes referred to as a consumer cluster, to read from the database (e.g., as one or more external tables, allowing the datashare database to be referenced in queries (e.g., SQL statements) or other data access requests). A datashare may grant access to a database data, including superblocks stored for different partitions or slices of a database in data storage service 270.

In some embodiments, database service 210 may have at least one processing cluster attached to a database, which may be the "primary cluster" or "main cluster." Primary clusters may be reserved, allocated, permanent, or otherwise dedicated processing resources that store and/or provide access to a database for a client, in some embodiments. Primary clusters, however, may be changed. Techniques to resize or change to a different configuration of a primary cluster may be performed, in some embodiments. The available processing clusters that may also be attached, as determined, to a database may be maintained (as noted earlier) in different configuration type pools, which may be a set of warmed, pre-configured, initialized, or otherwise prepared clusters which may be on standby to provide additional query performance capacity for a primary cluster. Control plane 220 may manage cluster pools by managing the size of cluster pools (e.g., by adding or removing processing clusters based on demand).

As databases are created, updated, and/or otherwise modified, snapshots, copies, or other replicas of the database at different states may be stored separate from database service 210 in data storage service 250, in some embodiments. For example, a leader node, or other processing cluster component, may implement a backup agent or system that creates and store database backups for a database to be stored as database data 272 in data storage service 270. Database data 272 may include user data (e.g., tables, rows, column values, etc.) and database metadata (e.g., information describing the tables which may be used to perform queries to a database, such as schema information, data distribution, range values or other content descriptors for filtering out portions of a table from a query, etc.). A timestamp or other sequence value indicating the version of database data 272 may be maintained in some embodiments, so that the latest database data 272 may, for instance, be obtained by a processing cluster in order to perform queries. In at least some embodiments, database data 272 may be treated as the authoritative version of data, and data stored in processing clusters 232 for local processing as a cached version of data.

Data storage service 270 may implement different types of data stores for storing, accessing, and managing data on behalf of clients 250 as a network-based service that enables clients 250 to operate a data storage system in a cloud or network computing environment. Data storage service(s) 270 may also include various kinds of object or file data stores for putting, updating, and getting data objects or files. For example, one data storage service 270 may be an object-based data store that allows for different data objects of different formats or types of data, such as structured data (e.g., database data stored in different database schemas), unstructured data (e.g., different types of documents or media content), or semi-structured data (e.g., different log files, human-readable data in different formats like JavaScript Object Notation (JSON) or Extensible Markup Language (XML)) to be stored and managed according to a key value or other unique identifier that identifies the object.

In at least some embodiments, data storage service(s) 270 may be treated as a data lake. For example, an organization may generate many different kinds of data, stored in one or multiple collections of data objects in a data storage service 270. The data objects in the collection may include related or homogenous data objects, such as database partitions of sales data, as well as unrelated or heterogeneous data objects, such as audio files and web site log files. Data storage service(s) 270 may be accessed via programmatic interfaces (e.g., APIs) or graphical user interfaces. For example, format independent data processing service 220 may access data objects stored in data storage services via the programmatic interfaces.

Generally speaking, clients 250 may encompass any type of client that can submit network-based requests to provider network 200 via network 260, including requests for storage services (e.g., a request to query a database service 210, or a request to create, read, write, obtain, or modify data in data storage service(s) 270, etc.). For example, a given client 250 may include a suitable version of a web browser, or may include a plug-in module or other type of code module that can execute as an extension to or within an execution environment provided by a web browser. Alternatively, a client 250 may encompass an application such as a database application (or user interface thereof), a media application, an office application or any other application that may make use of database service(s) 210 or storage resources in data storage service(s) 270 to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application that can interact directly with provider network 200. In some embodiments, client 250 may generate network-based services requests according to a Representational State Transfer (REST)-style network-based services architecture, a document- or message-based network-based services architecture, or another suitable network-based services architecture.

In some embodiments, a client 250 may provide access to provider network 200 to other applications in a manner that is transparent to those applications. For example, client 250 may integrate with an operating system or file system to provide storage on one of data storage service(s) 270 (e.g., a block-based storage service). However, the operating system or file system may present a different storage interface to applications, such as a conventional file system hierarchy of files, directories and/or folders. In such an embodiment, applications may not need to be modified to make use of the storage system service model. Instead, the details of interfacing to the data storage service(s) 270 may be coordinated by client 250 and the operating system or file system on behalf of applications executing within the operating system environment. Similarly, a client 250 may be an analytics application that relies upon data processing service(s) 210 to execute various queries for data already ingested or stored in the data processing service (e.g., such as data maintained in a data warehouse service).

Clients 250 may convey network-based services requests (e.g., access requests to read or write data may be directed to data in data storage service(s) 270, or operations, tasks, or jobs, such as queries, being performed as part of data processing service(s) 210) to and receive responses from provider network 200 via network 260. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet. In some embodiments, clients of data processing services 210, format independent data processing service 220, and/or data storage service(s) 270 may be implemented within provider network 200 (e.g., an application hosted on a virtual computing resource that utilizes a data processing service 210 to perform database queries) to implement various application features or functions and thus various features of client(s) 250 discussed above may be applicable to such internal clients as well.

Figure 3:
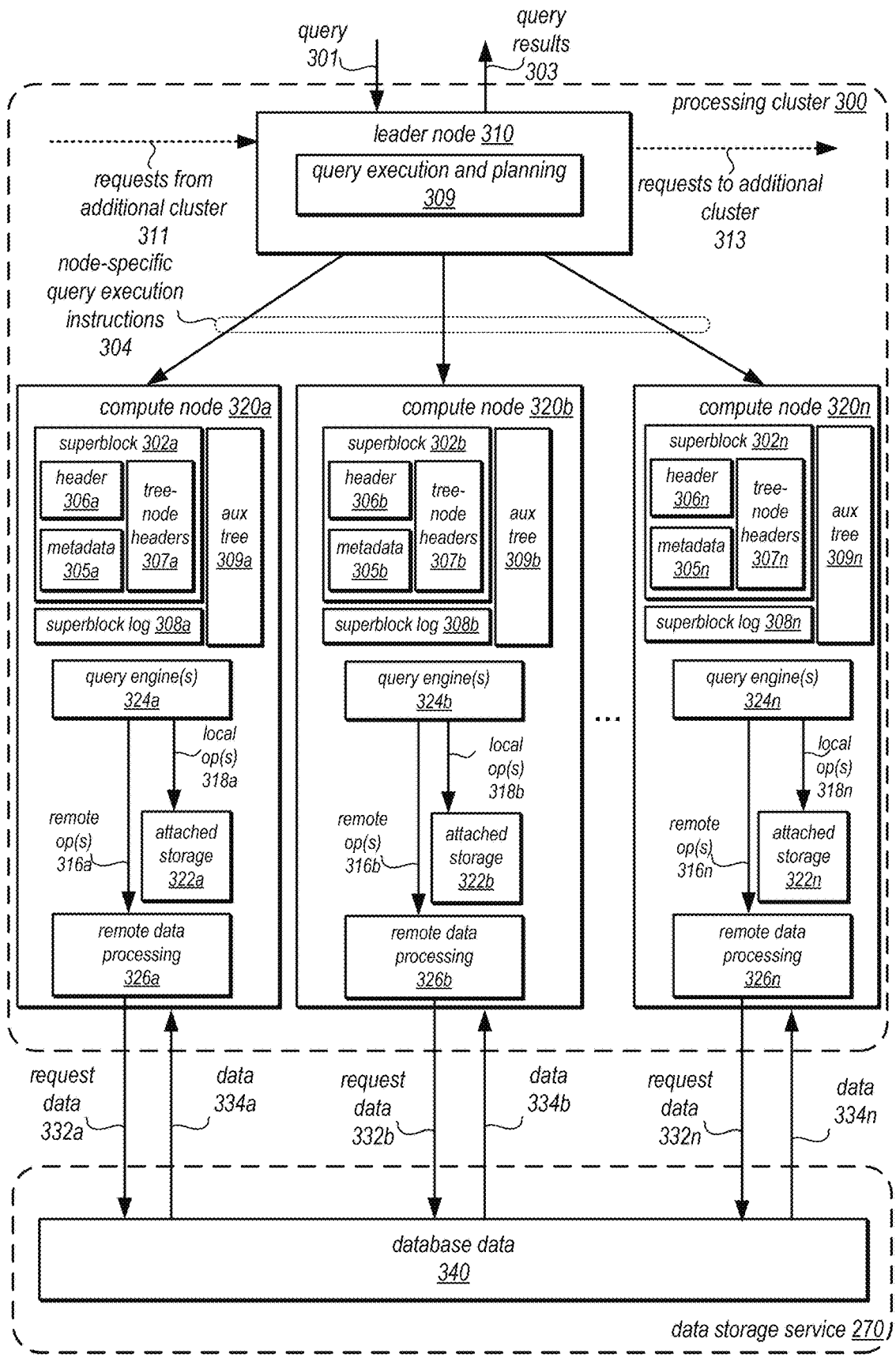
FIG. 3 is a logical block diagram illustrating an example processing cluster of a database service that implements efficient superblock data structures, according to some embodiments.

FIG. 3 is a logical block diagram illustrating an example processing cluster of a database service that implements efficient superblock data structures for database systems, according to some embodiments. Processing cluster 300 may be query processing cluster, like processing clusters 232 discussed above with regard to FIG. 2, that distributes execution of a query among multiple computational (which may also be referred to as "compute") nodes. As illustrated in this example, a processing cluster 300 may include a leader node 310 and compute nodes 320a, 320b, and 320n, which may communicate with each other over an interconnect (not illustrated). Leader node 310 may implement query planning to generate query plan(s) and query execution 309 for executing queries on processing cluster 300 that perform data processing that can utilize remote query processing resources for remotely stored data (e.g., by utilizing one or more query execution slot(s)/queue(s)). As described herein, each node in a processing cluster 300 may include attached storage, such as attached storage 322a, 322b, and 322n, on which a database (or portions thereof) may be stored on behalf of clients (e.g., users, client applications, and/or storage service subscribers).

Note that in at least some embodiments, query processing capability may be separated from compute nodes, and thus in some embodiments, additional components may be implemented for processing queries. Additionally, it may be that in some embodiments, no one node in processing cluster 300 is a leader node as illustrated in FIG. 3, but rather different nodes of the nodes in processing cluster 300 may act as a leader node or otherwise direct processing of queries to data stored in processing cluster 300. While nodes of processing cluster may be implemented on separate systems or devices, in at least some embodiments, some or all of processing cluster may be implemented as separate virtual nodes or instance on the same underlying hardware system (e.g., on a same server).

Leader node 310 may manage communications with clients, such as clients 250 discussed above with regard to FIG. 2. For example, leader node 310 may communicate with a proxy service and may receive query 301 and return query results 303 to proxy service 240 (instead of communicating directly with a client application). Alternatively, in those embodiments where leader node 310 implements database query queue and query routing as a primary cluster, then leader node 310 may act as the proxy for other, secondary clusters, attached to the database, and may return query results directly to a client application.

Leader node 310 may be a node that receives a query 301 from various client programs (e.g., applications) and/or subscribers (users) (either directly or routed to leader node 310 from a proxy service), then parses them and develops an execution plan (e.g., query plan(s)) to carry out the associated database operation(s)). More specifically, leader node 310 may develop the series of steps necessary to obtain results for the query. Query 301 may be directed to data that is stored both locally within processing cluster 300 (e.g., at one or more of compute nodes 320) and data stored remotely. Leader node 310 may also manage the communications among compute nodes 320 instructed to carry out database operations for data stored in the processing cluster 300. For example, node-specific query instructions 304 may be generated or compiled code by query execution 314 that is distributed by leader node 310 to various ones of the compute nodes 320 to carry out the steps needed to perform query 301, including executing the code to generate intermediate results of query 301 at individual compute nodes may be sent back to the leader node 310. Leader node 310 may receive data and query responses or results from compute nodes 320 in order to determine a final result 303 for query 301.

A database schema, data format and/or other metadata information for the data stored among the compute nodes, such as the data tables stored in the cluster, may be managed and stored by leader node 310. Query planning may account for remotely stored data by generating node-specific query instructions that include remote operations to be directed by individual compute node(s). As illustrated in FIG. 3, processing cluster 300 could be a "primary" cluster that may send requests to an additional cluster for the database, as indicated at 313 in order to scale query performance (as discussed below with regard to FIG. 5), as part of a concurrency scaling technique add an additional processing cluster to increase processing capacity for a database system. Alternatively, if processing cluster 300 were a "secondary" processing cluster, then as illustrated at 311, additional requests may be received from the additional cluster (instead of query 301 and query results 303).

Processing cluster 300 may also include compute nodes, such as compute nodes 320a, 320b, and 320n. Compute nodes 320, may for example, be implemented on servers or other computing devices, such as those described below with regard to computer system 1000 in FIG. 8, and each may include individual query processing "slices" defined, for example, for each core of a server's multi-core processor, one or more query processing engine(s), such as query engine(s) 324a, 324b, and 324n, to execute the instructions 304 or otherwise perform the portions of the query plan assigned to the compute node. Query engine(s) 324 may access a certain memory and disk space in order to process a portion of the workload for a query (or other database operation) that is sent to one or more of the compute nodes 320. Query engine 324 may access attached storage, such as 322a, 322b, and 322n, to perform local operation(s), such as local operations 318a, 318b, and 318n. For example, query engine 324 may scan data in attached storage 322, access indexes, perform joins, semi joins, aggregations, or any other processing operation assigned to the compute node 320.

Query engine 324a may also direct the execution of remote data processing operations, by providing remote operation(s), such as remote operations 316a, 316b, and 316n, to remote data processing clients, such as remote data processing client 326a, 326b, and 326n. Remote data processing clients 326 may be implemented by a client library, plugin, driver or other component that sends request subqueries to be performed by data storage service 220 or requests to for data, 332a, 332b, and 332n. As noted above, in some embodiments, Remote data processing clients 326 may read, process, or otherwise obtain data 334a, 334b, and 334c, in response from database data 340 in data storage service 270, which may further process, combine, and or include them with results of location operations 318.

Compute nodes 320 may send intermediate results from queries back to leader node 310 for final result generation (e.g., combining, aggregating, modifying, joining, etc.). Remote data processing clients 326 may retry data requests 332 that do not return within a retry threshold.

Attached storage 322 may be implemented as one or more of any type of storage devices and/or storage system suitable for storing data accessible to the compute nodes, including, but not limited to: redundant array of inexpensive disks (RAID) devices, disk drives (e.g., hard disk drives or solid state drives) or arrays of disk drives such as Just a Bunch Of Disks (JBOD), (used to refer to disks that are not implemented according to RAID), optical storage devices, tape drives, RAM disks, Storage Area Network (SAN), Network Access Storage (NAS), or combinations thereof. In various embodiments, disks may be formatted to store database tables (e.g., in column oriented data formats or other data formats).

As part of executing a query or performing other actions, compute nodes 320 may implement, at least partially in memory and/or persistent storage, a respective superblock for corresponding portions of database data to which the compute node provides access, such as respective superblocks 302a, 302b, and 302n, which includes headers 306a, 306, and 306n, metadata 305a, 305b, and 305n, and tree-node headers 307a, 307b, and 307n. Also respective commit logs, 308a, 308b, and 308n, are maintained, which may be used to commit updates to superblocks 302. Like in FIG. 1, auxiliary data structures 309a, 309b, 309n, may be stored to include descriptions (e.g., block headers) for data stored in attached storage 322a, 322b, 322n and/or database data 340.

To commit changes or modifications to a superblock, a log-based commit technique may be performed. For example, in a least one embodiment, changes to database data (e.g., tables) may be received and identify dirty/new blocks to write. Instead of waiting for all user/application blocks to be written to a commit log as would occur of user/application data were stored within the superblock, block headers may be written into $B^\varepsilon$-tree blocks and the changes that are committed using the log may only be the modified $B^\varepsilon$-tree headers.

Figure 4:
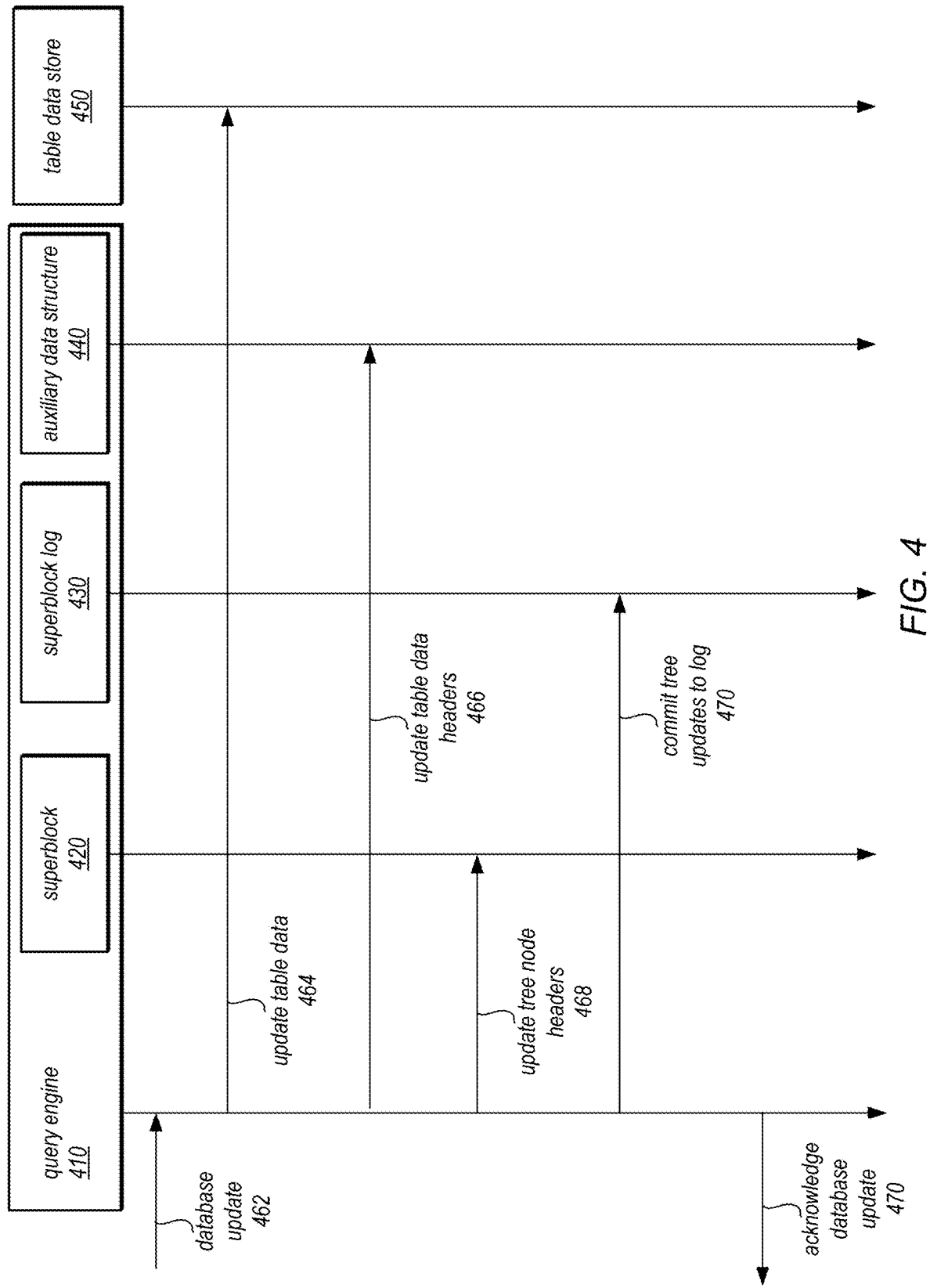
FIG. 4 is a sequence diagram illustrating interactions to update a superblock, according to some embodiments.

FIG. 4 is a sequence diagram illustrating interactions to update a superblock, according to some embodiments. Query engine 410 (e.g., implemented on a compute node, such as compute node 320 in FIG. 3 or access execution 130 in FIG. 1) may receive a database update 462. A database update 462 may be a request to add, remove, or modify values of a database, cause a change to a structure or schema of a database, or any other change that may cause alterations to information located using superblock 420. Query engine 410 may perform the update by updating table data 450, as indicated at 464. For example, a compute nodes may update corresponding portions of the table data store (e.g., on the compute node and/or in a separate storage service). In some embodiments, superblock 420 (and other information such as superblock log 430 and auxiliary data structure 440 may be initially accessed to determine which portions (blocks) of table data store 450 to update.

As indicated at 466, table data headers 466 may be updated in auxiliary data structure 440 may be updated, in some embodiments. For example, block header data blocks linked in a $B^\varepsilon$-tree may be updated according to the update.

As indicated at 468, tree node headers may be updated in superblock 420, in some embodiments. For example, block headers corresponding to different root, intermediate, or leaf nodes of a B-epsilon tree may be updated to include changes to the $B^\varepsilon$-tree. For example, the different updates, inserts, or deletion messages included in buffers of internal nodes in a $B^\varepsilon$-tree may be made. As indicated at 470, updates to the tree node headers may be committed to a log, using a log-based commit technique at superblock log 430. As indicated at 470, the database update may be acknowledged, in some embodiments.

Figure 5:
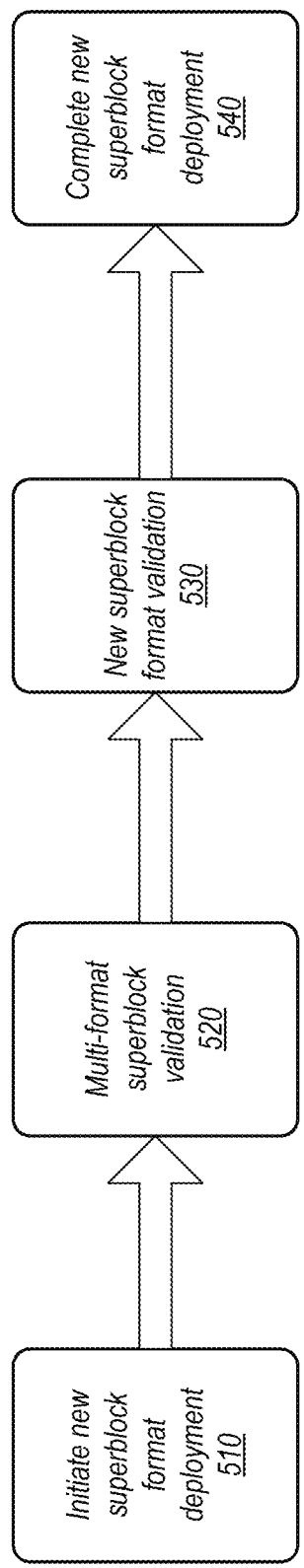
FIG. 5 is a logical block diagram illustrating different deployment phases of new superblock format, according to some embodiments.

FIG. 5 is a logical block diagram illustrating different deployment phases of new superblock format, according to some embodiments. Database operations, such as disaster recovery and datashare may leverage a superblock for recovery and to serve shared queries. For changes to a superblock format, there can be unforeseen effects for these or other database operations that can be impacted. Therefore, techniques that breakup deployment of a new superblock format, such as the efficient superblock format techniques discussed above and below may provide a way to safely transition to a new superblock format. Moreover, as further superblock format optimizations or changes are identified, these deployment techniques can be repeatedly use to continually update superblock formats across a fleet of database systems in a database service, in some embodiments.

For example, to improve confidence in a new superblock format, a trickle validation may be implemented as part of log-based commit (LBC) for the purpose of validating multiple formats (e.g., for validating the $B^\varepsilon$-tree as well). In one embodiment, LBC tracks a log of changed block headers; the replay of the log reconstructs the full superblock. Trickle validation of a commit X (assuming it contains a prolog+log blocks A→B→C+other blocks in the superblock array) may take a snapshot of in-memory superblock at time X and over the next few commits, replays log blocks A→B→C and ensures that reconstructed superblock is same as the in-memory superblock at commit time X.

As indicated at 510, deployment may be initiated for a new superblock format, in some embodiments. For example, a new superblock format may be the superblock format discussed above with regard to FIGS. 1 and 4 and below with regard to FIGS. 6 and 7. This may be selectively deployed in response to client requests (e.g., from a user via a control plane interface) or by a service administrator.

As indicated at 520, a first phase of deployment may be a multi-format superblock validation phase, in at least one embodiment. For example, in the multi-format phase, block headers may be recorded in log blocks of a commit log (as may be done in a current superblock format) as well as in a $B^\varepsilon$-tree for a new superblock format, which would not record the block headers as log blocks. On a restart of a database system (e.g., a processing cluster), the log can be replayed and install all headers into memory. The LBC trickle validation technique discussed above can be performed to validate that logged block headers match the in-memory superblock. Additionally, trickle validation can be performed to validate that the headers tracked by the $B^\varepsilon$-tree also match those in the in-memory superblock.

As indicated at 530, a second phase of deployment may be new superblock format validation, in some embodiments. For example, with this phase, block headers of user/application data may no longer be logged using LBC. LBC trickle validation may still continue to validate the superblock but it will validate a much smaller superblock now as it is logging only the $B^\varepsilon$-tree headers. The B-e tree trickle validation technique should now validate the $B^\varepsilon$-tree with the snapshot of the in-memory superblock, similar to its role in phase 1. At this point the superblock becomes small and it becomes viable to be used by disaster recovery and data sharing.

As indicated at 540, a third phase of deployment may be to complete new superblock format deployment, in some embodiments. In this phase, validation may only be performed to check correctness of BE-tree with respect to the logged $B^\varepsilon$-tree headers.

In the examples given above, trust may be established on $B^\varepsilon$-tree s a repository for storing blockchains of user/application data. After that $B^\varepsilon$-tree can be leveraged for queries to load blockchains on-demand, install headers per table etc. Note that throughout phases 1 and 2, backup and restore operate as the fail-safe mechanism to recover a cluster in case anything goes wrong with persisting the superblock.

Although FIGS. 2-5 have been described and illustrated in the context of a provider network implementing a database service, like a data warehousing service, the various components illustrated and described in FIGS. 2-5 may be easily applied to other database services that can utilize efficient superblock data structures for database systems. As such, FIGS. 2-5 are not intended to be limiting as to other embodiments of scheduling heterogeneous background tasks for improving data cluster processing performance.

Figure 6:
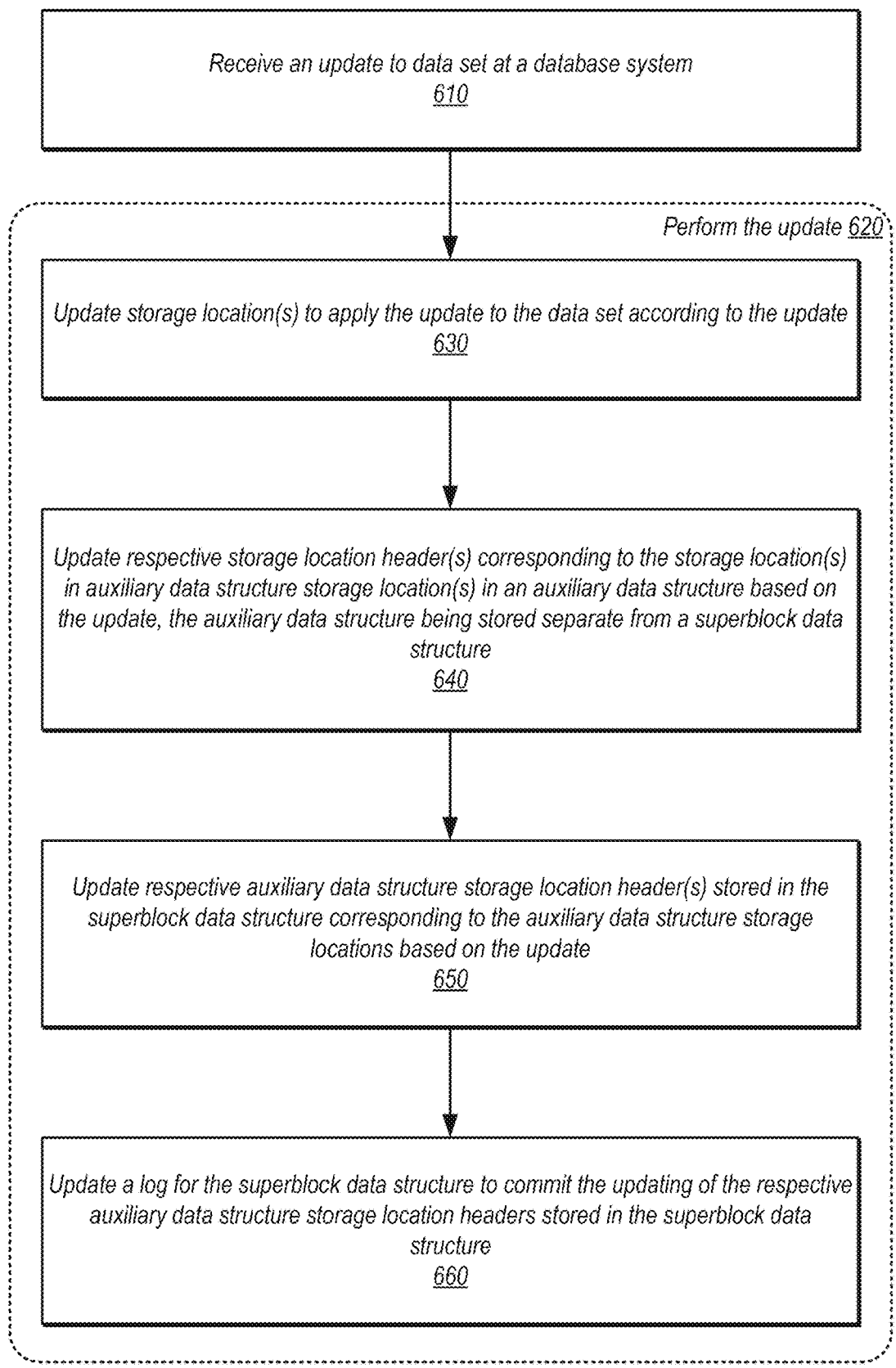
FIG. 6 is a high-level flowchart illustrating methods and techniques to implement efficient superblock data structures for a database system, according to some embodiments.

FIG. 6 is a high-level flowchart illustrating methods and techniques to implement efficient superblock data structures for database systems, according to some embodiments. Various different data processing systems and devices may implement the various methods and techniques described below, either singly or working together. For instance, different types of database systems may implement these techniques. Alternatively, various other combinations of different systems and devices located within or without provider networks may implement the below techniques. Therefore, the above examples and or any other systems or devices referenced as performing the illustrated method, are not intended to be limiting as to other different components, systems, or devices.

As indicated at 610, an update to a data set may be received set at a database system, in some embodiments. In at least one embodiment, the update may be received as SQL or other query language statement, API, or other interface command to change, modify, add, or remove data from a data set. In at least one embodiment, an update may include changing a schema, organization or layout of data. In at least one embodiment, an update may include changes that would be recorded in an underlying set of metadata (e.g., a blockchain or other set of associated metadata that describes blocks or other units of storage for database data in a storage system).

As indicated at 620, the update to the data set may be performed by the database system, in some embodiments. As indicated at 630, as part of performing the update, storage location(s) may be updated to apply the update to the distributed data set, in some embodiments. For example, an auxiliary data structure may store the descriptive information of storage units (e.g., blocks), as headers of different portions of data. In at least one embodiment, these headers may be organized or linked together as chains, which may be sorted or stored in groups according to indexing structure, such as a b-tree, log-structured merge tree or, as discussed above, a $B^\varepsilon$-tree. The storage location(s) to update may be identified by scanning or traversing the organized described information of storage units and evaluating the descriptive information to determine if the wanted data was present (e.g., a range of values in the block header may indicate whether a given value is present in the block).

As indicated at 640, as part of performing the update, respective storage location header(s) corresponding to the storage location(s) in an auxiliary data structure may be updated based on the update, in some embodiments. For example, if a new value is added, then descriptive information such as the range of values in a block may also be updated. As discussed above with regard to the example of a $B^\varepsilon$-tree, insert, delete, or other messages may be added to buffers of internal nodes, and/or split, flush or other operations performed to update the auxiliary data structure to record the updates. In at least some embodiments, the auxiliary data structure may be stored separate from the superblock data structure.

As indicated at 650, respective auxiliary data structure storage location header(s) stored in a superblock data structure corresponding to the auxiliary data structure storage may be updated based on the update, in at least some embodiments. For example, the headers that describe the contents of the auxiliary data structure (e.g., the root node, internal nodes and pointers to leaf nodes) may be stored in the superblock data structure and be updated to reflect the changes made to the auxiliary data structure (e.g., messages added, flushed, nodes split or other changes in a $B^\varepsilon$-tree).

As indicated at 660, as part of performing the update, a log for the superblock data structure to commit the updating of the respective auxiliary data structure storage location headers stored in the superblock data structure, in some embodiments. For example, log record(s) may be added that describe the change(s) to the auxiliary data structure headers (e.g., the changes to the root node, internal nodes and pointers to leaf nodes).

Figure 7:
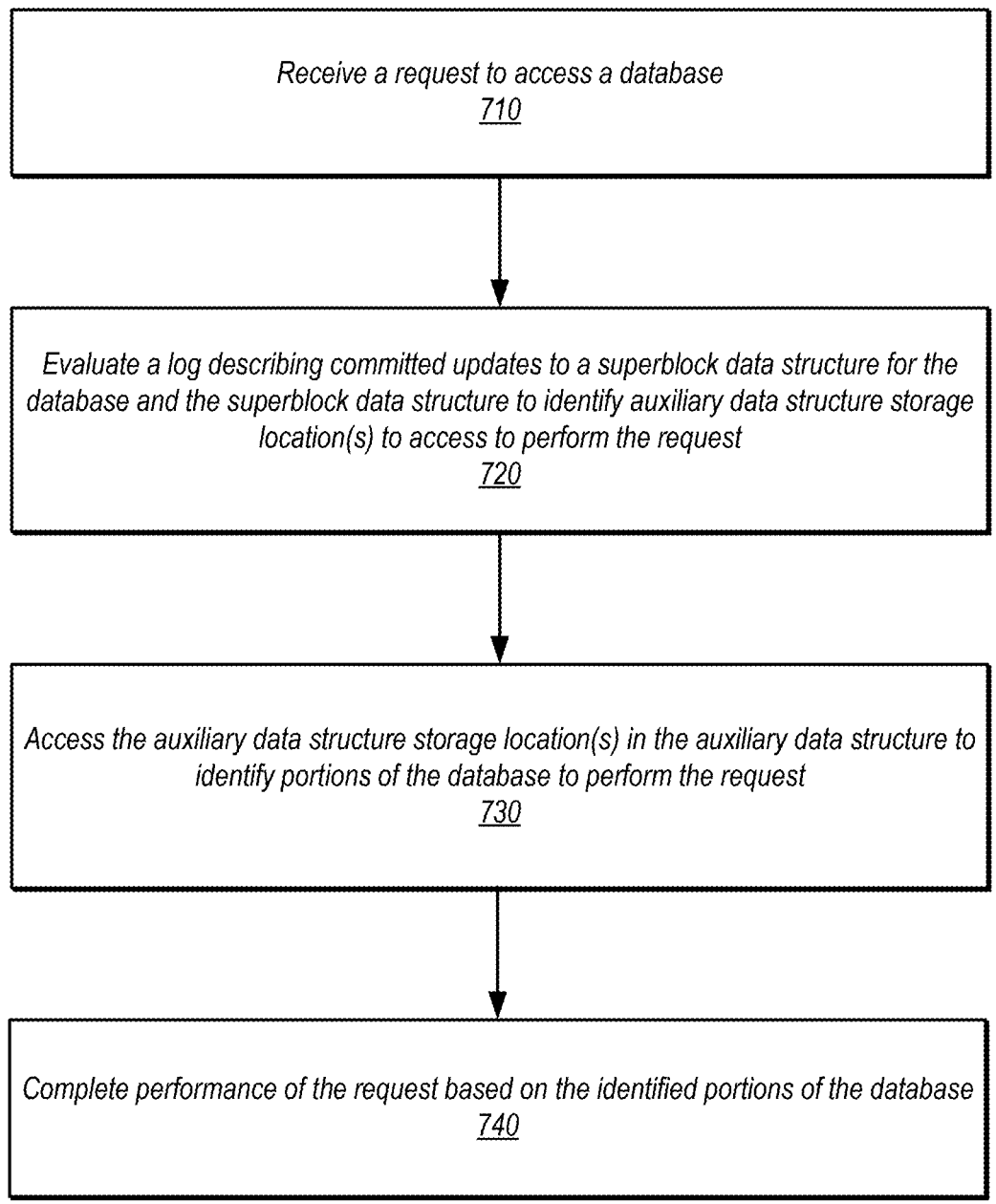
FIG. 7 is a high-level flowchart illustrating methods and techniques to implement performing access requests efficient superblock data structures for database systems, according to some embodiments.

FIG. 7 is a high-level flowchart illustrating methods and techniques to implement performing access requests efficient superblock data structures for database systems, according to some embodiments. As indicated at 710, a request to access a database may be received, in some embodiments. For example the request may be a query, read request, or other access request (e.g., based on a datashare by specifying a shared database as feature or element of a query).

As indicated at 720, a log describing committed updates to a superblock data structure for the database may be evaluated to identify auxiliary data structure storage location(s) to access to perform the request, in some embodiments. For example, some changes may be committed to the log but not yet applied (or have been restored to the auxiliary data structure). As indicated at 730, the auxiliary data structure storage location(s) may be accessed to identify portions of the database to perform the request, in some embodiments. For example, the auxiliary data structure locations may point or identify user/application data blocks to read or otherwise access in order to perform the access request. As indicated 740, performance of the request may be completed based on the identified portions of the database, in some embodiments. For example, query predicates may be applied to data values retrieved from the accessed data blocks.

Embodiments of efficient superblock data structures for database systems as described herein may be executed on one or more computer systems, which may interact with various other devices. One such computer system is illustrated by FIG. 8. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing node, compute node, computing device, compute device, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions that execute on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may coordinate I/O traffic between processor 1010, system memory 1020, and any peripheral devices in the device, including network interface 1040 or other peripheral interfaces, such as input/ output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

Figure 8:
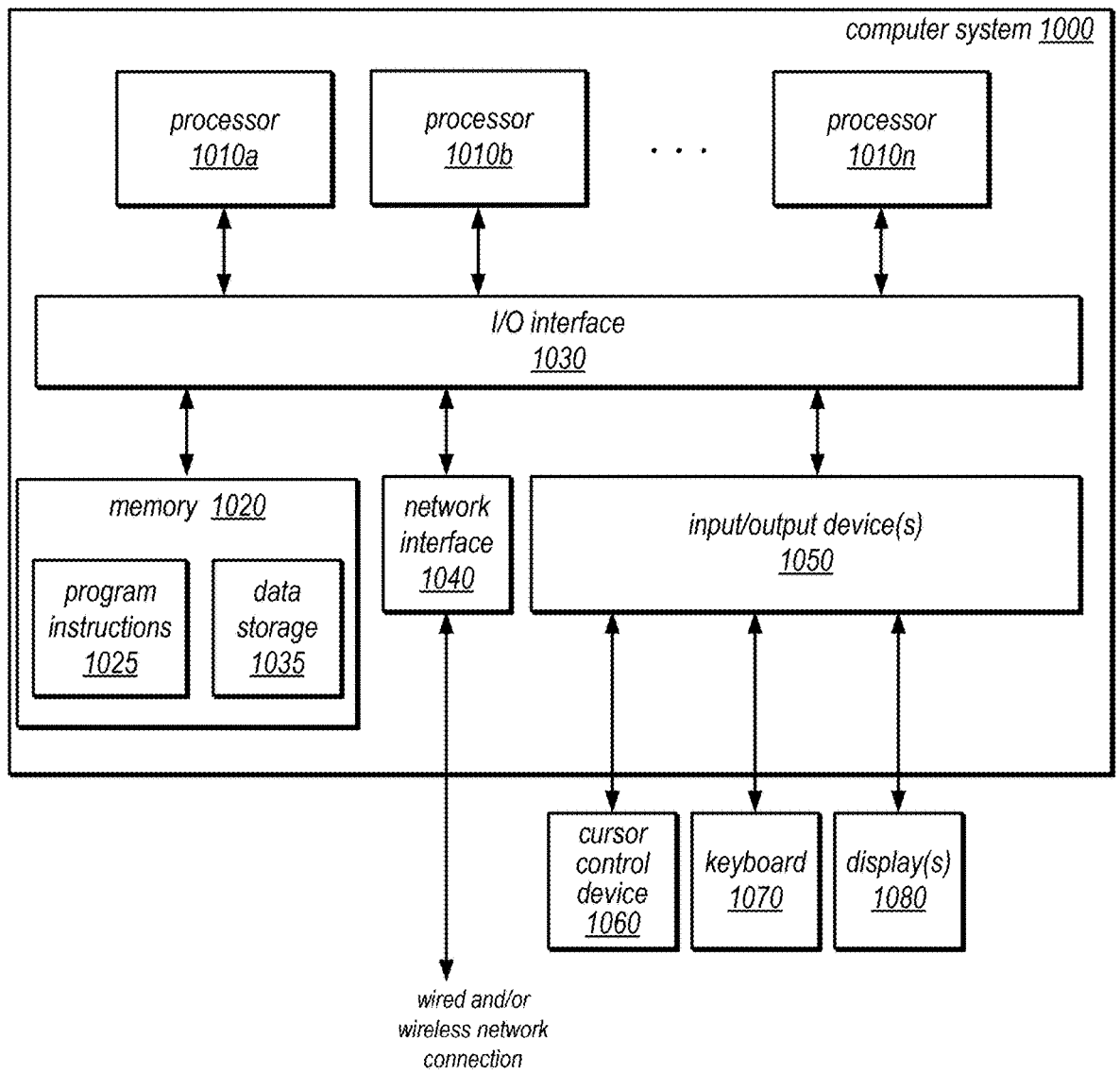
FIG. 8 illustrates an example system that implements the various methods, techniques, and systems described herein, according to some embodiments.

As shown in FIG. 8, memory 1020 may include program instructions 1025, that implement the various methods and techniques as described herein, and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
a plurality of computing devices, respectively comprising at least one processor and a memory, configured to implement a distributed database system that stores one or more tables as part of a database;
wherein the distributed database system is configured to:
receive an update to the database;
performing an update to a distributed data set by a distributed database system, comprising:
write one or more storage locations to apply the update to the distributed data set according to the update;
write respective storage location headers corresponding to the one or more storage locations in one or more auxiliary data structure storage locations in an auxiliary data structure based, at least in part, on the update to the distributed data set, wherein the auxiliary data structure is stored separate from a superblock data structure; and
write respective auxiliary data structure storage location headers stored in the superblock data structure corresponding to the one or more auxiliary data structure storage locations based, at least in part, on the update to the distributed data set; and
write one or more records to a log for the superblock data structure to commit the write of the respective auxiliary data structure storage location headers stored in the superblock data structure.

2. The system of claim 1, wherein the distributed database system is further configured to:
receive a request to access the distributed data set;
evaluate the log for the superblock data structure and the superblock data structure to identify an auxiliary data structure storage location to access to perform the request;
access the auxiliary data structure storage location to identify a portion of the distributed data set to perform the request; and
complete performance of the request based, at least in part, on the identified portions of the database.

3. The system of claim 2, wherein the request is a query received from a client application.

4. The system of claim 2, wherein the access request is based on a datashare between the distributed database system and another distributed database system with permission to access the distributed data set.

5. A method, comprising:
performing an update to a data set by a database system, comprising:
updating one or more storage locations to apply the update to the data set according to the update;
updating respective storage location headers corresponding to the one or more storage locations in one or more auxiliary data structure storage locations in an auxiliary data structure based, at least in part, on the update to the data set, wherein the auxiliary data structure is stored separate from a superblock data structure; and
updating respective auxiliary data structure storage location headers stored in the superblock data structure corresponding to the one or more auxiliary data structure storage locations based, at least in part, on the update to the data set; and
updating a log for the superblock data structure to commit the updating of the respective auxiliary data structure storage location headers stored in the superblock data structure.

6. The method of claim 5, further comprising:
receiving, by the database system, a request to access the data set;
evaluating the log for the superblock data structure and the superblock data structure to identify an auxiliary data structure storage location to access to perform the request;
accessing the auxiliary data structure storage location to identify a portion of the data set to perform the request; and
completing performance of the request based, at least in part, on the identified portions of the database.

7. The method of claim 6, wherein the request is a query received from a client application.

8. The method of claim 6, wherein the access request is based on a datashare between the database system and another database system with permission to access the data set.

9. The method of claim 7, wherein the database system is an additional database system added to a primary database system to increase capacity to access the data set.

10. The method of claim 5, wherein the update to the data set is validated using a different format of the superblock data structure.

11. The method of claim 5, wherein the update to the distributed data set is validating using a trickle validation technique and an in-memory snapshot of the superblock data structure.

12. The method of claim 5, wherein the auxiliary data structure is a $B^\varepsilon$-tree.

13. The method of claim 5, wherein the database system is a database service implemented as part of a provider network that hosts the data set as a distributed database.

14. One or more non-transitory, computer-readable storage media, storing program instructions that when executed on or across one or more computing devices cause the one or more computing devices to implement:
performing an update to a data set by a database system, comprising:
causing one or more storage locations to apply the update to the distributed data set according to the update;
causing respective storage location headers corresponding to the one or more storage locations in one or more auxiliary data structure storage locations in an auxiliary data structure to be updated based, at least in part, on the update to the data set, wherein the auxiliary data structure is stored separate from a superblock data structure; and
causing respective auxiliary data structure storage location headers stored in the superblock data structure corresponding to the one or more auxiliary data structure storage locations to be updated based, at least in part, on the update to the data set; and causing a log for the superblock data structure to be updated to commit the updating of the respective auxiliary data structure storage location headers stored in the superblock data structure.

15. The one or more non-transitory, computer-readable storage media of claim 14, storing further program instructions that when executed on or across the one or more computing devices, cause the one or more computing devices to further implement:
   receiving, by the database system, a request to access the data set;
   evaluating the log for the superblock data structure and the superblock data structure to identify an auxiliary data structure storage location to access to perform the request;
   accessing the auxiliary data structure storage location to identify a portion of the data set to perform the request; and
   completing performance of the request based, at least in part, on the identified portions of the database.

16. The one or more non-transitory, computer-readable storage media of claim 15, wherein the request is a query received from a client application.

17. The one or more non-transitory, computer-readable storage media of claim 15, wherein the access request is based on a datashare between the database system and another database system with permission to access the data set.

18. The one or more non-transitory, computer-readable storage media of claim 15, wherein the database system is an additional database system added to a primary database system to increase capacity to access the data set.

19. The one or more non-transitory, computer-readable storage media of claim 14, wherein the auxiliary data structure is a $B^{\varepsilon}$-tree.

20. The one or more non-transitory, computer-readable storage media of claim 14, wherein the database system is a database service implemented as part of a provider network that hosts the data set as a distributed database.

* * * * *